United States Patent [19]

Fischer

[11] Patent Number: 4,695,030
[45] Date of Patent: Sep. 22, 1987

[54] QUICK RELEASE CLAMP

[76] Inventor: Jay P. Fischer, 210 Hopkins Rd., Watertown, Conn. 06795

[21] Appl. No.: 772,048

[22] Filed: Sep. 3, 1985

[51] Int. Cl.⁴ .............................................. B25B 5/08
[52] U.S. Cl. .................................................... 248/507
[58] Field of Search ............... 248/507, 509, 500, 680, 248/681; 292/240; 403/409, 374

[56] References Cited

U.S. PATENT DOCUMENTS

| 1,149,488 | 8/1915 | Arndt | 292/240 |
|---|---|---|---|
| 2,733,493 | 2/1956 | Copell | 264/86 |
| 2,862,040 | 11/1958 | Curran | 174/51 |
| 2,896,295 | 7/1959 | Fischer | 248/507 |
| 2,917,267 | 12/1959 | Riddle | 248/507 |
| 3,219,371 | 11/1965 | Danly | 403/189 |
| 3,387,814 | 6/1968 | Fischer | |
| 3,926,294 | 12/1975 | Bastian | 403/374 |

Primary Examiner—Reinaldo P. Machado
Assistant Examiner—Alvin Chin-Shue
Attorney, Agent, or Firm—Thomas R. Morrison

[57] ABSTRACT

A quick release clamp for securing components having a recessed base to a support having spaced internally threaded bores, said clamp having a body portion, a head portion at the top thereof and an outwardly extending lip adjacent the bottom of said clamp for engaging the component recess. A central bore in the body and head portion carries a resilient insert which is slidable therein. An elongated screw is threaded through the insert and receivable in one of the internally threaded bores. Rotation of the clamp as the screw member is threaded into the support brings the lip into locking contact with the component recess and a cammed surface on the bottom of the body into frictional contact with the component. A second cam substantially similar in shape and orientation to the bottom cam is formed on the top of the head and serves to aid in the accurate positioning of the bottom cam.

3 Claims, 8 Drawing Figures

QUICK RELEASE CLAMP

BACKGROUND OF THE INVENTION

This invention relates to quick release clamps such as are used to secure mechanical or electrical components to a support and is an improvement on U.S. Pat. No. 3,387,814 issued June 11, 1968, entitled Component Mounting Clamp. Clamps of the present type are particularly suited to the mounting of electronic components such as synchro encoders or other feed back devices in a servo loop, where it is necessary to adjust the component to obtain an accurate null indication before placement into operation. In addition, easy removal and replacement of the component is greatly desired. The clamp must be easy to install, dependable in the presence of vibration, shock and large temperature variations.

Accordingly, it is an object of the present invention to provide a quick release clamp for securing components to a support which will overcome the shortcomings of the prior art devices.

Another object of the present invention is to provide a quick release clamp which permits easy adjustment of the component upon the support without removal of the clamp.

A further object of the present invention is to increase the strength of a quick release clamp without substantially increasing its size.

Still another object of the present invention is to facilitate the user's ability to position the clamp upon the component with accuracy.

A further object of the present invention is to provide a quick release clamp of greater stability, locking strength, shock and vibration resistance than prior art devices.

SUMMARY

Quick release clamps of the present invention comprise a non-circular cam shaped body, a head portion, a cam shaped bottom element and a locking lip member integral with but extending laterally from the body, spaced from the bottom thereof. The clamp body is provided with a vertical transverse bore within which is carried a resilient insert. A clamp tightening screw is axially threaded within the insert and is of a length to be received within an internally threaded bore in a support plate. Recesses in the support plate receive the components to be clamped. Cut out portions such as radial grooves in the components receive the locking lip of the clamp as it is rotated and the screw tightened to secure the component in place.

BRIEF DESCRIPTIONS OF THE DRAWINGS

In the accompanying drawing forming part hereof similar elements have been given the same reference numbers, in which drawings.

DETAILED DESCRIPTION

Figure 1:
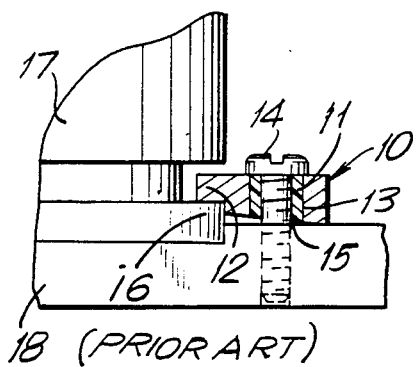
FIG. 1 is a view in side elevation of a clamp made in accordance with the prior art.

Referring to the drawing and particularly to FIG. 1 there is shown a prior art clamp 10 having a clamp body portion 11 and an extending clamping lip 12. It will be seen that the extending clamping lip 12 projects from the top of the body portion 11. The body portion is centrally bored as indicated at 13 to receive therethrough a screw member 14. A plastic insert 15, such as nylon, is carried within the bore 13 for the purpose of receiving the screw member 14. The clamping lip 12 is adopted to overlie a flange 16 of a mechanical or electric component 17. The screw member 14 is of a length so that it will transverse the body portion 11 and be threadably received within a support 18 underlying the component 17. In this manner the component 17 may be secured to the support 18 as the screw member is tightened to the position shown in FIG. 1. The effect of the prior art structure is to restrict the height of the body portion 11 of the clamp, a restriction which becomes quite important when thinner clamps are required and where greater strength is desirable. In addition, the nylon insert 15 of FIG. 1 substantially fills the central bore 13 which can result in the insert being extruded from the bore as the clamp is tightened, or the threads in the insert stripped.

Figure 2:
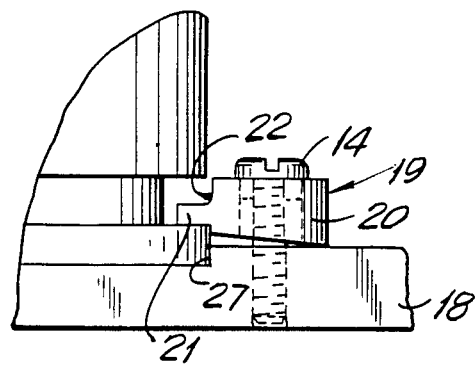
FIG. 2 is a view in side elevation similar to FIG. 1 but showing a clamp according to the present invention.
Figure 3:
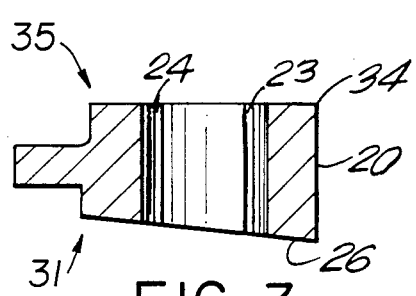
FIG. 3 is a view in vertical section, somewhat enlarged, of the clamp body of FIG. 2.
Figure 4:
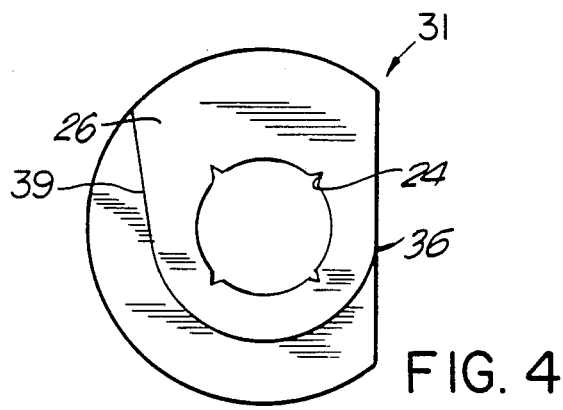
FIG. 4 is a bottom plan view on an enlarged scale of FIG. 3.

Referring to FIG. 2, there is shown a clamp 19 made in accordance with the present invention. This clamp has a noncircular body portion 20 and a laterally extending clamping lip 21. It will be noted that the clamping lip in the present invention is located substantially at the bottom of the body portion 20. For the purposes of increased strength a radius 22 is formed between the clamping lip 21 and the body portion 20. The central bore 23 (best shown in FIG. 3) is provided with longitudinal grooves 24 (as shown in FIGS. 3 and 4). A resilient insert 25 made of some suitable plastic such as nylon is carried within the bore 23. The insert is pressed into the grooves 24 by a screw member 14 in the manner shown in FIGS. 5 and 6. The screw member 14 may be guided through the insert 25 by an undersized longitudinal bore so that when the screw cuts its threads through it the nylon or resilient material of the insert is forced laterally into the longitudinal grooves 24 so that the insert 25 is prevented from turning. Alternately, the longitudinal bore may be internally threaded.

Figure 5:
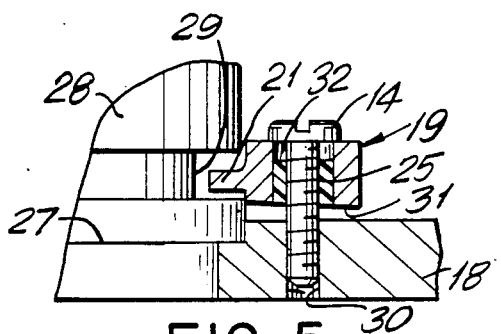
FIG. 5 is a view similar to FIG. 2, partly in section, during an early state in the application of the clamp to a component.
Figure 6:
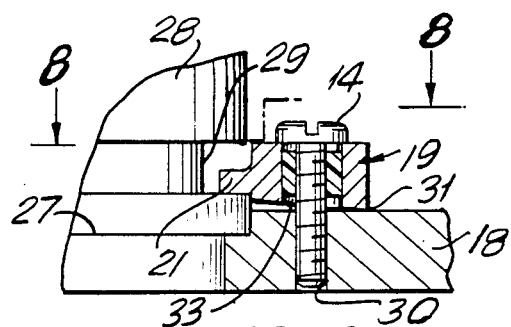
FIG. 6 is a view similar to FIG. 5 showing the clamp in its phased in or locked stage.

It will be seen from an examination of FIGS. 5 and 6 that the resilient insert 25 is shorter than the length of the bore 23 in the clamp body 19. Initially, the insert 25 is placed at a position within the body 20 so that space 32 is provided between the top of the insert and the top of the body 20 as shown in FIG. 5. After the clamp has been tightened in accordance with the showing of FIG. 6, the resilient insert will move up into the space 32 at least partially, leaving a space 33 beneath the insert and above the support 18. The advantage of this construction is to prevent users of the clamp from stripping the nylon threads in the insert as the clamp is tightened, thereby causing the nylon to cold flow and form a new thread contact which will be weaker than the original screw threads. The additional space 32 can be achieved in the present invention due to the location of the clamping lip 21 spaced from the bottom of the clamp body 20 so that a head portion 34 of desired height can be provided even where thinner clamps are specified.

Another advantage of the clamping lip 21 location close to the bottom of the body 20 is that the height of the said body may be increased to add strength to the clamp and also to permit the plastic insert 25 to be made larger and still within the clamp body 20 in the manner shown in FIGS. 5 and 6.

Figure 7:
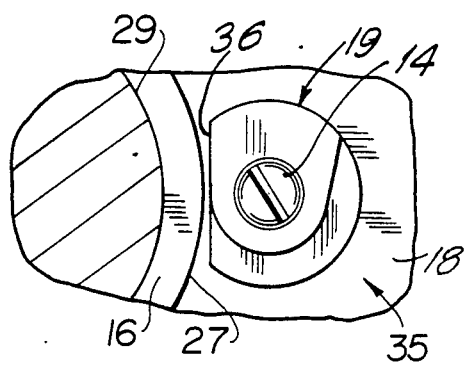
FIG. 7 is a top plan view of a clamp made in accordance with the present invention in its released position.
Figure 8:
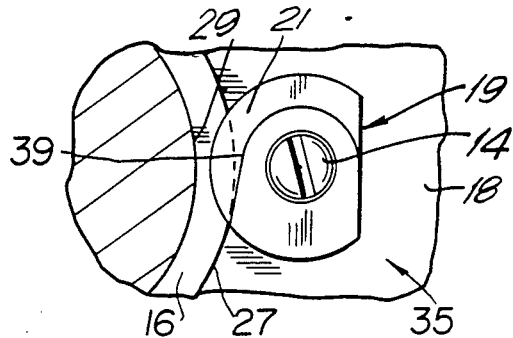
FIG. 8 is a top plan view take on line 8—8 in FIG. 6 showing the clamp in a phased in or locked position.

It will be observed from an examination of FIG. 4 that the bottom 31 of the body portion 20 is formed with a stepped cam-shaped portion 26 corresponding in shape to the top configuration 35 of the clamp (see FIGS. 7 and 8). A stop 39 on cam-shaped portion 26 abuts flange 16 in the fully engaged position. As a result, it is possible from a examination of the top of the clamp to determine the position of the bottom cam-shaped portion 26 as the clamp is being used. When the clamp is in its tightened position upon the component 28, the bottom of clamping lip 21 is brought into mechanical contact with flange 16 below the reduced portion 29 to provide additional radial frictional locking strength to the assembly. It is important that the clamp bottom can be brought into its maximum holding orientation as tightening is completed.

The support 18 is recessed as shown at 27 in FIGS. 2, 5 and 6 to receive the component 28 such as a synchro encoder having a reduced annular portion 29 spaced from the bottom thereof. The support 18 is provided with two or more internally threaded bores 30 to receive the screw member 14 of each clamp.

The bottom 31 of the body portion 20 of the clamp is skewed as shown in FIGS. 5 and 6 at 31 so that the clamp is finally brought into a line-to-line contact with the bottom of the reduced portion 29.

From the foregoing, the operation of the quick release clamp of the present invention will be apparent as follows:

With the support 18 properly provided with component receiving recesses 27 and spaced threaded bores 30, a quick release clamp is threaded into each of the bores until the clamp touches the surface of the support 18. Each of the clamps is then backed off a sufficient amount so that the flat side 36 thereof will clear the component surface as shown in FIG. 7. The component 28, such as a synchro encoder component, is then slipped into the recess 27 and one or more of the quick release clamps rotated 90° into the position shown in FIG 8 and screw members 14 tightened. The screw member 14 rotate the clamp 19 until stopped by contact between the stop 39 and flange 16. The component will then be held in place sufficiently well to permit tests upon the component such as null indication tests, etc. During these tests it may be necessary to rotate the component within the recess 27, in which event the clamp 19 can be turned back to the position of FIG. 7, thereby releasing its hold upon the component and permitting the component to be either adjusted or removed from the support 18. After the position of the component is properly adjusted, the remaining clamps can be rotated through the 90° turn required to bring them into the position shown in FIGS. 6 and 8.

Having thus fully described the invention, what is desired to be claimed and secured by Letters Patent is:

1. A clamp for securing a component having an annular flange thereon to a support, comprising:
    a clamp body having a central bore therein;
    said clamp body including a top and a bottom;
    a clamping lip extending about a portion, and less than all of a perimeter of said clamp body;
    a first cam-shaped portion on said bottom;
    said first cam-shaped portion extending a substantial distance below said clamping lip;
    said first cam-shaped portion and said clamping lip being joined along a generally linear stop;
    a clamping screw;
    a first diameter of said central bore being substantially greater than a second diameter of said clamping screw;
    a plastic insert in said central bore occupying substantially all of a radial distance between said first diameter and said second diameter;
    said plastic insert having a length substantially less than a length of said central bore;
    a second cam-shaped portion on said top;
    said second cam-shaped portion extending a substantial distance above said clamping lip, whereby a length of said central bore is increased; and
    said second cam-shaped portion having a shape substantially identical to said first cam-shaped portion and aligned therewith, whereby a rotational position of said first cam-shaped portion is ascertainable by observing the same rotational position of said second cam-shaped portion.

2. A clamp according to claim 1 wherein said linear stop is positioned for abutment with a surface of said annular flange when said clamp is tightened upon said annular flange.

3. A clamp according to claim 1, further comprising a substantial radius joining said second cam-shaped portion to said clamping lip, whereby said clamping lip is strengthened.

* * * * *